United States Patent Office 3,298,995
Patented Jan. 17, 1967

3,298,995
POLYESTERURETHANE ELASTOMERS HAVING IMPROVED COLOR CHARACTERISTICS
Robert R. Bloor and Edmond G. Kolycheck, Lorain, Ohio, assignors to The B. F. Goodrich Company, New York, N.Y., a corporation of New York
No Drawing. Filed Jan. 21, 1964, Ser. No. 339,080
7 Claims. (Cl. 260—45.85)

This invention relates to a method for improving the color characteristics of polyesterurethane elastomers and to the modified polymers produced thereby. More particularly, this invention concerns a method for improving the initial color of polyesterurethane elastomers and for enhancing their color-stability in the presence of light, which method comprises reacting the polyesterurethane-forming ingredients while in contact with a critically small amount of an amine-acetic acid chelating agent.

Polyesterurethane elastomers, also nominally referred to in the literature as polyesterurethane gums or rubbers, "elastomeric urethane reaction products" and the like, are made by condensing low molecular weight polyesters with aromatic diisocyanates to give high molecular weight linear polymers. The polyesterurethane can be the substantially non-crosslinked variety wherein the polymer chain has been extend by the inclusion of an aliphatic glycol in the polymerization reactants; or the polyester-urethane can be of the crosslinked variety obtained by heating and reacting the linear polyesterurethane with additional diisocyanate. The polyesterurethane-forming reaction generally is carried out at elevated temperatures, e.g., within the range of about 120° C. to 250° C., for a period of time sufficient to provide substantially complete reaction of active hydrogen containing reactants with the available isocyanate groups.

Heretofore, the color of polyesterurethane elastomers have been darker than desired, frequently being a dark yellow and sometimes appearing brown. This is disadvantageous because it is difficult to prepare pure white elastomers when compounding the rubbers with white pigments, such as titanium dioxide, if the rubber has a pronounced yellow or brown tinge. It is also easier to produce variously colored elastomers having standardized or consistent color depth if the rubber stock to be compounded with a pigment or dye is essentially colorless or only slightly yellow. Another disadvantage attaching to polyesterurethane elastomers is their tendency to progressively darken upon prolonged exposure to light. It is, therefore, the object of the present invention to provide a process for producing lighter-colored polyester-urethane elastomers. It is a further object to provide modified polyesterurethane elastomers which have improved color stability in the presence of ultra-violet radiation.

It has now been discovered that in the conventional process for producing a polyesterurethane elastomer by heating and polymerizing a reaction mixture comprising as essential polyesterurethane-forming ingredients: (A) one mol equivalent of a hydroxyl terminated polyester of a saturated, aliphatic glycol having from 2 to 10 carbon atoms and having hydroxyl groups on its terminal carbon atoms and an aliphatic dicarboxylic acid having from 2 to 10 carbon atoms and (B) at least 0.7 mol equivalent of an aromatic diisocyanate; the color of said elastomeric reaction product is improved by incorporating into said reaction mixture, prior to the heating thereof, from 0.03 to 0.4%, based on the weight of the reaction product, of a chelating agent which is an acetic acid-substituted aliphatic alkylene amine having from 1 to 5 acetic acid constituents, 0 to 3 hydroxyl groups attached to terminal carbon atoms of an alkylene group, active hydrogen atoms only in said acetic acid groups and hydroxyl groups, and 1 to 3 amino nitrogen atoms whose valences are connected only to carbon atoms (i.e. the amine is tertiary amine).

In general, the polyesterurethane products of this invention are conveniently prepared by first mixing said small amount of chelating agent, one mol equivalent of polyester, optional polyurethane modifying compounds and at least about 0.7 mol equivalent of aromatic diisocyanate together at an elevated temperature so that the polyesterurethane-producing ingredients form a homogeneous melt containing the chelating agent uniformly dispersed throughout. Normally, a temperature of about 85 to 100° C. is sufficient to obtain this state. The chelating agent is a solid material which is not soluble in the polyester and/or diisocyanate in this temperature range. It is therefore advantageously employed in the form of a fine powder or granulation to achieve a substantially uniform dispersion thereof in the reaction mixture, for example, particles having diameters of from about 0.03 mm. to around 2 mm., however, particles smaller than 0.5 mm. are preferred.

The polymerization of the reactants, which is advantageously exothermic, is then carried out at a temperature within the range of from about 120° C. to about 250° C. At these elevated temperatures the chelating agent becomes compatible with the reactants and appears to dissolve therein. The reaction period ranges from about 3 minutes to about one hour, the rate of reaction being dependent on the temperature employed. The reaction period needs be no greater than that required to insure essentially complete stoichiometric utilization of the reactants in accordance with their molar equivalencies as charged. The reaction should be carried out under essentially anhydrous conditions with dry reactants, that is, the reaction mixture is substantially free of water which would react with isocyanate groups to form undesirable by-products. As a practical matter, there should be less than about 0.1% and preferably less than 0.05% of water present in the reaction mixture. Essentially anhydrous conditions can be assured by simply heating the polyester and optional modifying compounds at low pressure before they are mixed with the diisocyanate.

The basic polyester reactant embodied in the polyesterurethane is essentially linear and is hydroxyl terminated. It is the condensation product obtained by an esterification of an aliphatic dicarboxylic acid or an anhydride thereof with a straight chain glycol containing 2 to 10 carbon atoms and having its hydroxyl groups on the terminal carbon atoms, in general, those glycols represented by the structure $HO(CH_2)_xOH$ wherein $x$ is 2 to 10 (preferably 2 to 6), such as ethylene glycol, 1,3-propanediol, 1,4-butanediol, 1,5-pentanediol, 1,6-hexanediol, and the like and mixtures thereof. Examples of the aliphatic, dibasic carboxylic acids utilized in preparing the polyester are adipic, succinic, pimelic, suberic, azelaic, sebacic and the like, or their anhydrides. The dicarboxylic acid may be represented by the formula $HOOC(CH_2)_nCOOH$, where $n$ is a number from 0 to 8, preferably 4 to 6. In the esterification reactions, molar ratios of more than one mol of glycol per mol of acid are preferred so as to obtain essentially linear chains containing a preponderance of terminal hydroxyl groups. The methods and details of manufacturing such polyesters are well known. The polyester suitable for urethane elastomers is characterized by having an average molecular weight between about 400 and about 5,000, a hydroxyl number between about 275 and 15 and an acid number of less than 10, preferably less than 7. The quality of the polyurethane product increases as the acid number of the polyester decreases. An acid number of less than about 4.0 is thus more preferred, and an acid number of less than 2.0 is most desirable.

The aromatic diisocyanate embodied in the elastomer of this invention includes such compounds as the diphenyl diisocyanates and the diphenyl methane diisocyanates, especially 4,4'-diphenyl diisocyanate and 4,4'-diphenylene methane diisocyanate; the dimethyl diphenyl methane diisocyanates, the diphenyl ether diisocyanates, the dichloro-diphenyl methane diisocyanates, bibenzyl diisocyanate, bitolylene diisocyanate, dianisidine diisocyanate, para-phenylene diisocyanate, meta-phenylene diisocyanate, naphthalene-1,5-diisocyanate, meta-toluene diisocyanate, tetrachloro m-phenylene diisocyanate, durene diisocyanate, and the like and mixtures thereof.

The aforementioned optional modifying compound which may be included in the polyurethane-producing reaction mixture is one that contains an active hydrogen, i.e., a hydrogen which will react with an isocyanate (NCO) group. In the case of the so-called "casting type" polyesterurethanes wherein the ratio of isocyanate groups to all active hydrogen groups in the polymer is greater than 1.0, the optional modifying compound therein may be a glycol, diamine or amino alcohol which provides additional substituted urea or urethane groups as points for the future crosslinking. The final curing takes place by reacting the excess isocyanate groups with the substituted urea or urethane groups at around 100 to 150° C. The "casting type" polyesterurethanes must be processed shortly after mixing the components. In the case of the so-called "storage-stable" polyesterurethanes which are prepared initially with only part of the total diisocyanate to be finally reacted, i.e., the ratio of isocyanate groups to all active hydrogen groups in the initial polymerization reaction mixture is less than 1.0, the curing or crosslinking of the elastomer is accomplished by adding more isocyanate thereto and heating under pressure. Thus, in this polyester-diisocyanate reaction, no modifying compound is required. In the case of the non-crosslinked, thermoplastic type of polyesterurethane elastomers wherein the number of isocyanate groups in the reaction mixture is essentially equivalent to the number of active hydrogens, the optional modifying agent is a dihydroxy compound.

Examples of the preferred type of polyesterurethane elastomer susceptible to color improvement and stabilization in accordance with the practice of this invention are described in U.S. Patent No. 2,871,218 and copending U.S. application Serial No. 294,933 of Robert M. Carvey and Edmond G. Kolycheck, filed July 15, 1963. Each reference describes a polyesterurethane elastomer which is substantially free of crosslinked structures and substantially soluble in such solvents as cyclohexanone, tetramethyl urea and dimethyl formamide. Said elastomer comprises the reaction product obtained by heating a mixture comprising as essential ingredients: (A) 1.0 mol of an essentially linear, hydroxyl terminated polyester of a saturated aliphatic glycol having from 2 to 10 carbon atoms and the hydroxyl groups on the terminal carbon atoms and an aliphatic dicarboxylic acid containing from 2 to 10 carbon atoms, or the anhydride of the dicarboxylic acid, said polyester having a molecular weight between 600 and 1,200 and an acid number less than 10, (B) from about 1.1 to 3.1 mols of a diphenyl diisocyanate having an isocyanate group on each phenyl nucleus, and (C) from about 0.1 to 2.1 mols of a saturated, aliphatic, free glycol containing from 2 to 10 carbon atoms and having hydroxyl groups on its terminal carbon atoms, the molar amount of the polyester and the free glycol combined being essentially equivalent to the molar amount of the diphenyl diisocyanate so that there are essentially no unreacted isocyanate or hydroxyl groups in the polyesterurethane product. The glycol serves as a chain extending constituent in the polymeric structure of the urethane elastomer. The above-described polyesterurethane, marketed under the trade name "Estane" is a thermoplastic, extrudable, moldable, abrasion resistant, tough elastomer.

Another example of the substantially non-crosslinked type of polyesterurethane is that described in U.S. Patent No. 3,001,971 as being a weather resistant elastomer comprising the reaction product of one mol of polyester, from about 1.0 to 5.0 mols of an aromatic dihydroxyl compound and from about 2.0 to 6.0 mols of an aromatic diisocyanate, the molar amount of the diisocyanate being substantially equivalent to the molar amount of the polyester and the aromatic dihydroxyl compound combined.

An important "shelf-stable" polyesterurethane, exemplary of those susceptible to color improvement when modified according to this invention, is described in U.S. Patent No. 2,625,535, wherein the polyester component is reacted with a molar deficiency of aromatic diisocyanate to provide an elastomer which is curable at a later time by causing it to react with additional diisocyanate. A further example of the type of product which may be modified in accordance with this invention is disclosed in U.S. Patent No. 2,770,612, which describes an easily processable polyesterurethane rubber obtained by reacting one mole of a polyester of ethylene glycol and an aliphatic dicarboxylic acid with from 1.02 to 1.1 mols of an aromatic diisocyanate. The non-crosslinked product may be cured by subsequent reaction with additional diisocyanate. Of course, the above-described polyesterurethane elastomers are merely exemplary since there are many types and variations known to the trade.

As stated previously, the chelating agent, which is incorporated into the polyesterurethane-forming reaction mixture prior to the initiation of polymerization by the application of heat thereto, is an acetic acid-substituted aliphatic alkylene amine having from 1 to 5 acetic acid constituents, from 0 to 3 hydroxyl groups attached to terminal carbon atoms of an alkylene group, active hydrogen atoms only in said acetic acid constituents and hydroxyl groups, and 1 to 3 nitrogen atoms bonded only to carbon atoms. Chelating agents conforming to these requirements include the alkylene diamine tetraacetic acids represented by the formula:

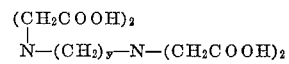

where $y$ is an integer of 2 to 8. The commercially available ethylenediaminetetraacetic acid ($y$ is 2) gives excellent results. Of a similar nature are the triamine pentaacetic acids represented by the formula:

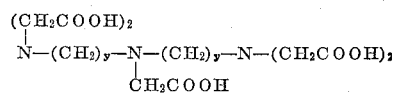

where $y$ is an integer of 2 to 8. Diethylenetriaminepentaacetic ($y$ is 2) is preferred.

Exemplary of hydroxyl-containing chelating agents operable herein are the N,N'-di(hydroxyalkyl)-substituted glycines represented by the formula:

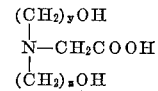

where $y$ and $z$ are each integers of from 2 to 8. N,N'-di(hydroxyethyl)glycine is preferred ($y$ is 2 and $z$ is 2). Other representative hydroxylated chelating agents are the hydroxyalkyl-alkylenediaminetriacetic acids represented by the formula:

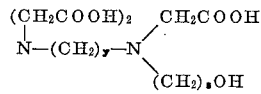

where $y$ and $z$ are each integers of from 2 to 8. Preferred is hydroxyethyl-ethylenediaminetriacetic acid ($y$ is 2 and $z$ is 2).

Another and more preferred class of chelating agents of the type embodied herein are the alkyliminodiacetic acids represented by the formula:

$$X-N-(CH_2COOH)_2$$

where X is an alkyl group having from 8 to 24 carbon atoms. Most preferred is dodecyliminodiacetic acid. (X is $C_{12}H_{25}$.)

Another representative class of operable chelating agents are the triacetic acid-substituted alkylene diamines having the structure:

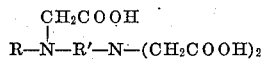

where R is a hydrocarbon group having from 6 to 22 carbon atoms, and R' is an alkylene group having from 2 to 10 carbon atoms. It is preferred that R be an alkyl group and R' have from 2 to 3 carbon atoms. Illustrative specific compounds falling into this class are the following:

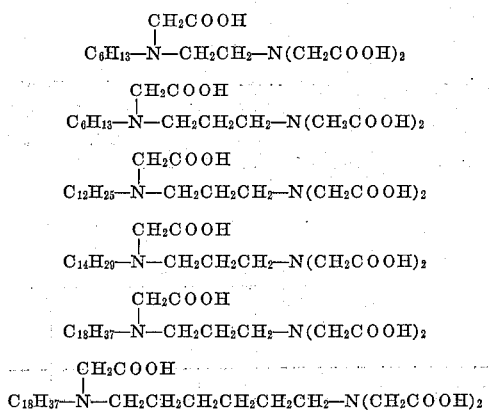

$$\begin{array}{c} CH_2COOH \\ | \\ C_{18}H_{37}-N-CH_2CH_2CH_2CH_2CH_2CH_2-N(CH_2COOH)_2 \end{array}$$

The chelating agents of this class are readily prepared by reacting chloroacetic acid in neutral solution with various alkyl-substituted alkylene polyamines. The acid reacts with the active hydrogen on the amino nitrogens to yield triacetic acid-substituted polyamine and by-product HCl. The acid chelator is precipitated by lowering the reaction pH to an acid level of 2. The products are solids and easily recovered by filtration, then washed and dried. The preparation of these triacetic acid-substituted alkylene diamine chelating agents is more fully described in the copending patent application of R. E. Morris, R. D. Taylor and R. J. Fawcett, Serial No. 192,080, filed May 3, 1962, now U.S. Patent 3,228,904. The incorporation of such chelators into polyesterurethane elastomers of the linear, uncrosslinked type described in the aforementioned U.S. Patent 2,871,218 is disclosed in the copending patent application of C. S. Schollenberger and W. T. Murphy, Serial No. 301,174, filed August 9, 1963, wherein the amount of chelator added to the elastomers is from 0.5 part to 5.0 parts per 100 parts by weight of the elastomer. When added to the solid elastomer or to a solution of the elastomer in the manner and amount set forth in said copending application, the chelator additive serves to inhibit environmental stress cracking in the elastomer, but the color characteristics of the product are not affected. The method and results thereof are thus distinguished from the procedure embodied in this invention wherein 0.03 to 0.4% of the chelator is initialy added to the compounds which are subsequently reacted to form the polyesterurethane; the additive in such a critically small proportion serves as a color modifier and not as an inhibitor for stress cracking.

The mechanism or manner in which the small amount of chelating agent added to the polyesterurethane-forming reactants improves the color characteristics of the polymers subsequently produced therefrom is not known. Significantly, it has been found that the admixture of a chelating agent embodied herein into a mixture of compounds subsequently reacted to produce a polyetherurethane elastomer (i.e., where the polyester of the aforesaid polyesterurethane formulations is replaced by a polyalkylene ether glycol) does not result in a color improvement of the polyetherurethane rubber. However, it should be noted that in the production of the so-called polyetheresterurethanes which are made by mixing together various polyesters and polyethers, or various glycols, polyalkylene ether glycols and dibasic acids, and then reacting them with aromatic diisocyanates in varyng amounts, the chelating agent will have a beneficial effect on color, provided there is a substantial amount of polyester present.

As aforementioned, the chelating agent is added to the polyesterurethane-forming mixture in a critically small amount, specifically 0.03 to 0.4% by weight of the reactants polymerized, and since the reaction is substantially complete, the amount of chelator can correspondingly be expressed as 0.03 to 0.4% of the polyesterurethane product. No significant improvement in the color characteristics of the polymer is observed if less than about 0.03% of chelator is used. When greater than about 0.4% is charged, the product elastomer has inferior mechanical properties, and in particular, a pronounced decrease in tensile strength is observed. Moreover, although the color of the elastomer becomes progressively better as the amount of chelator is increased within said range of 0.03% to about 0.4%, a further increase is not beneficial to color and is quite harmful with regard to other physical properties. The preferred amount of chelating agent from the standpoint of attaining a pronounced color improvement without a significant reduction in tensile strength lies in the range of about 0.05 to 0.2%.

Representative methods of synthesizing some of the preferred chelating agents embodied herein are next presented. Dodecyliminodiacetic acid is prepared as follows: Chloracetic acid (1.1 mole) in 800 ml. of ethanol is neutralized by the adtition of 125 ml. of 10 normal aqueous sodium hydroxide. Dodecylamine (0.5 mole) is added to the mixture and the solution is heated to 80° C. The pH is maintained at from 8 to 10 by the gradual addition of more sodium hydroxide solution until the theoretically required amount of sodium hydroxide has been added. The reaction mixture is then brought to room temperature and the dodecyliminodiacetic acid is precipitated by bringing the pH of the mixture to 2 with concentrated hydrochloric acid. The product is isolated by filtration and is washed twice with distilled water and dried to a constant weight of 141.3 g. (94% of theory).

In a similar manner octadecyliminodiacetic acid and other alkyliminodiacetic acids are prepared.

A chelating agent having the structure

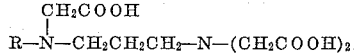

where R is a mixture of alkyl groups having an average of 13 carbon atoms is prepared as follows. Chloracetic acid (2.24 moles) in 400 ml. of methanol is neutralized with 31% NaOH solution. 0.25 mol of "Duomeen CD" ($R-NHCH_2CH_2CH_2NH_2$, wherein R is a mixture of alkyl groups having an average of 13 carbon atoms) is added thereto. The reaction mixture is brought to 70–73° C. and its pH is maintained at 8–10 by the addition of more NaOH solution until the pH becomes fairly constant for a period of time. The mixture is cooled and the product is precipitated with hydrochloric acid (pH of 2). The solid is isolated by filtration, washed and dried. In a similar manner chelating agents of the formula

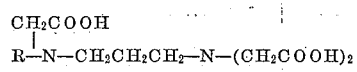

wherein R is a mixture of alkyl groups having an average of from 17 to 18 carbon atoms, are prepared starting with "Duomeen S" and "Duomeen T" mixed alkyl-substituted alkylene diamines. The Duomeens are sold by the Armour Industrial Chemical Company, Chicago, Illinois.

EXAMPLES OF POLYESTERURETHANE PREPARATION

The polyesterurethane elastomers described in the following examples were prepared as follows. One mol of 1,4-butanediol was mixed and stirred for about one to five minutes at a temperature of about 85° to 100° C. with one mol of a hydroxyl terminated polyester [hydroxyl poly(tetramethylene adipate)] having a molecular weight of 1,000, an acid number of 3.0 and a hydroxyl number of 106. The mixture was separated into two or more measured portions. Chelating agent was added to one or more of the portions, while no chelating agent was added to at least one of the portions.

To the individual portions of the diol-polyester mixture were charged essentially stoichiometric equivalent amounts of diphenyl methane-p,p-diisocyanate (usually referred to as MDI), that is, the molar amount of the diisocyanate was substantially equal to the molar amount of the polyester and glycol combined. The reaction mixture was stirred for 3 to 8 minutes at 140° C. and aged at 140° C. for about 30 minutes on the average. The polyesterurethane product was cooled to yield a flexible elastomer which was subsequently molded at 175° C. for five minutes at 20,000 to 35,000 p.s.i.g. into sheets 0.077 inch thick to provide samples for physical testing. The elastomers lacking the chelating agent were designated as "control" samples. The concentration of chelating agent is reported in the tables of data as percent by weight based on the combined weight of the substituent ingredients reacted to form the polyesterurethane elastomer, which weight is essentially equivalent to the total weight of the product elastomer. The data relating to the physical properties of the elastomers were obtained according to the tests and procedures listed below. The symbol (—) in a table of data indicates that the particular determination was not made.

Ultimate tensile strength in lbs./sq. inch, percent ultimate elongation (i.e. at break) and modulus (tensile stress) at 300% elongation were determined as per ASTM test method D–412–51–T.

Hardness was determined using a durometer as per ASTM test method D–676–59–T.

The color of an elastomer was measured by comparing the color of a 2% solution of the polyesterurethane in tetrahydrofuran with the well-known APHA color standards. Unless otherwise indicated, the colors reported are "initial" colors, that is, the color of the product measured immediately after it had been molded into a sheet.

Example I

This series of experiments compared the effectiveness of three chelating agents in inhibiting color formation in the polyesterurethane synthesis. The chelator concentration was 0.17% in experiments 2–4.

| Experiment | Chelating Agent | Elastomer APHA Color |
|---|---|---|
| 1 (Control) | None | 45 |
| 2 | Ethylenediaminetetraacetic acid | 35 |
| 3 | $(C_{18}H_{37})_{ave.}-\overset{\underset{\displaystyle CH_2COOH}{\mid}}{N}-(CH_2)_3-N-(CH_2COOH)_2$ | 35 |
| 4 | Dodecyliminodiacetic acid | 30 |

Example II

In this group of experiments the effect of the chelating agent on the mechanical physical properties of the elastomer, as well as on its color, were noted. The data is tabulated in Table A. It is seen that use of the chelator additives results in the sacrifice of some tensile strength but the hardness of the elastomer is not appreciably affected.

TABLE A

| Experiment | Chelating Agent, (Amount) | Physical Properties of Polyesterurethane | | | | |
|---|---|---|---|---|---|---|
| | | APHA Color | Tensile | Elong. | Modulus | Shore Hardness, "A" Scale |
| 5 (Control) | None | 20 | 9,675 | 570 | 1,500 | 88 |
| 6 | Ethylenediaminetetraacetic acid, (0.17%) | 10 | 6,300 | 540 | 1,500 | 86 |
| 7 (Control) | None | 55 | 8,100 | 530 | 1,380 | 87 |
| 8 | $(C_{18}H_{37})_{ave.}-\overset{\underset{\displaystyle CH_2COOH}{\mid}}{N}-(CH_2)_3-N-(CH_2COOH)_2$, (0.34%) | 30 | 7,350 | 570 | 1,230 | 87 |
| 9 (Control) | None | 50 | 8,400 | 510 | 1,500 | 86 |
| 10 | Dodecyliminodiacetic acid, (0.34%) | 15 | 6,960 | 600 | 1,390 | 85 |
| 11 (Control) | None | 45 | 7,500 | 600 | 1,200 | 89 |
| 12 | N,N'-dihydroxyethyl glycine, (0.17%) | 15 | 5,010 | 660 | 1,080 | 85 |

Example III

The results of this series of experiments viewed with the results of others described herein illustrate that (a) at least about 0.03% of chelator is required to provide a color improvement for the polyesterurethane and (b) relatively large amounts of chelator have a significant degradative effect on the physical properties of the polyesterurethane with little or no improvements in color characteristics. The data are presented in Table B.

thesized with and without chelator. The polyesterurethane samples were exposed to ultraviolet radiation from a General Electric Company germicidal lamp for up to 14 days. The colors of the polymers were measured by a Photovolt (Photoelectric) Reflection Meter model 610, a product of the Photovolt Corporation, New York, N.Y. Employing this measuring device, the instrument readings become lower in value as the color of a polymer specimen darkens. The data presented below show that the chela-

TABLE B

| Experiment | Chelating Agent, (Amount) | Physical Properties of Polyesterurethane | | | | |
|---|---|---|---|---|---|---|
| | | APHA Color | Tensile | Elong. | Modulus | Shore Hardness, "A" Scale |
| 13 (Control) | None | 25 | 8,790 | 550 | 1,380 | 87 |
| 14 | $(C_{18}H_{37})_{ave.}$—N(CH$_2$COOH)—(CH$_2$)$_3$—N—(CH$_2$COOH)$_2$, (0.07%) | 15 | 7,830 | 560 | 1,425 | 87 |
| 15 | $(C_{18}H_{37})_{ave.}$—N(CH$_2$COOH)—(CH$_2$)$_3$—N—(CH$_2$COOH)$_2$, (0.16%) | 20 | 8,240 | 570 | 1,320 | 87 |
| 16 (Control) | None | 40 | 6,880 | 590 | 1,200 | 87 |
| 17 | Dodecyliminodiacetic acid, (0.007%) | 40 | 7,460 | 590 | 1,150 | 85 |
| 18 | Dodecyliminodiacetic acid, (0.007%) | 20 | 6,880 | 600 | 1,180 | 86 |
| 19 | Dodecyliminodiacetic acid, (0.7%) | 20 | 2,240 | 710 | 800 | 86 |
| 20 (Control) | None | 45 | 7,440 | 570 | 1,290 | 85 |
| 21 | Dodecyliminodiacetic acid, (0.034%) | 35 | 7,890 | 580 | 1,290 | 85 |
| 22 | Dodecyliminodiacetic acid, (0.05%) | 35 | 7,860 | 570 | 1,290 | 87 |
| 23 | Dodecyliminodiacetic acid, (0.17%) | 30 | 7,800 | 600 | 1,350 | 88 |

Example IV

This example illustrates that the use of a chelator in accordance with this invention not only improves the initial color of the polyesterurethane but also serves to inhibit color formation in the polyurethane as it ages; in fact, there is a surprising tendency for the color of the polyurethane to become less intense as the material undergoes prolonged exposure to light, i.e., as if light had a bleaching effect on the polymer made with chelating agent. In this series of experiments, the chelating agent was the triacetaic acid-substituted alkylene diamine having the structure

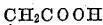
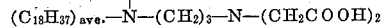

$(C_{18}H_{37})_{ave.}$—N(CH$_2$COOH)—(CH$_2$)$_3$—N—(CH$_2$COOH)$_2$

The color of the polyesterurethane was determined immediately following its manufacture; samples thereof then were exposed to natural light for the indicated periods and the colors measured with the following results.

| Experiment | Chelator Concentration, Percent | APHA Color of Polyesterurethane After Exposure to light for— | | | |
|---|---|---|---|---|---|
| | | 0 days (initial) | 6 days | 7 days | 14 days |
| 13 | None (control) | 25 | 35 | | |
| 14 | 0.07 | 15 | 15 | | |
| 15 | 0.16 | 20 | 15 | | |
| 24 | None (control) | 50 | | 55 | 65 |
| 25 | 0.34 | 35 | | 30 | 25 |

Example V

This example shows the effects of prolonged exposure to ultraviolet light on polyesterurethane elastomers syntor gives improved initial color and also protects the polymer against U.V. catalyzed degradation.

| Experiment | Chelating Agent (Amount) | Color of Polyesterurethane, Photovolt Reading after Exposure to U.V. light for— | | | | |
|---|---|---|---|---|---|---|
| | | 0 hrs. (initial) | 16 hrs. | 64 hrs. | 168 hrs. | 336 hrs. |
| 26 | 0 (control) | 31 | 28 | 24 | 24 | 22 |
| 27 | Dodecyliminodiacetic acid (0.086%) | 39.5 | 39.5 | 38 | 36.5 | 35 |

Example VI

This example illustrates the present invention's specific applicability to polyesterurethanes. Instead of the polyesterurethane elastomer described in the preceding examples, a polyetherurethane elastomer having similar properties was prepared by essentially the same techniques (i.e., corresponding moral ratios and reaction temperatures); however, the formulation differed from the earlier recipe in that a polypropylene glycol having a molecular weight of 1000 was substituted for the hydroxyl terminated polyester used previously. The polypropylene glycol was blended with the 1,4-butanediol and to this mixture was added 0.01% of stannous octoate catalyst. The blend was split into two equal portions, each of which was reacted with equimolar quantities of diphenyl methane-p,p'-diioscyanate, one reaction mixture containing in admixture 0.17% of dodecyliminodiacetic acid, the other mixture lacking this additive. Comparison of the colors of the polyetherurethane products revealed that the one made with the chelating agent had a color with approximately twice the intensity as that of the control sample.

It is to be understood that the foregoing examples of specific embodiments of the invention are merely illustrative and not limiting since modifications and variations may be made without departing from the scope and spirit of the invention as defined by the appended claims. Stated differently, the essence of invention lies in forming a polyesterurethane elastomer by reacting as essential ingredients a polyester and an aromatic diisocyanate, in the presence of the described chelating agent. Additional modifying compounds and additives incorporated in the polymers, either chemically by copolymerization, or mechanically by physical admixture of additives such as antioxidants and stabilizers, are contemplated to be within the ambit of the invention as it is well known to influence the physical characteristics of polyurethanes with sundry coreactants and modifiers.

We claim:

1. A polyesterurethane elastomer having improved color comprising the reaction product of a mixture of (A) a hydroxyl terminated polyester of a saturated aliphatic glycol containing from 2 to 10 carbon atoms and an aliphatic dicarboxylic acid containing from 2 to 10 carbon atoms, said polyester having an average molecular weight between about 400 and 5000 and (B) from 0.03 to 0.4% based on the weight of the total of (A) and (C) of an acetic acid substituted aliphatic alkylene amine having from 1 to 5 acetic acid constituents, from 0 to 3 hydroxyl groups attached to terminal carbon groups of an alkylene group, active hydrogen atoms only in said acetic acid groups and hydroxyl groups and 1 to 3 amine nitrogen atom valences are connected only to carbon atoms, with (C) at least 0.7 mol equivalent per mol of polyester of an aromatic diisocyanate.

2. The polyesterurethane of claim 1 wherein (A) is a polyester of a glycol having the formula $HO(CH_2)_xOH$ wherein $x$ is 2 to 6 and a dicarboxylic acid of the formula $HOOC(CH_2)_nCOOH$ wherein $n$ is preferably 4 to 6 and (B) is an aliphatic alkylene amine selected from the group consisting of those having the formula I 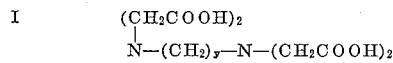

II 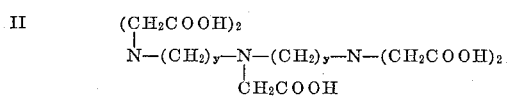

III 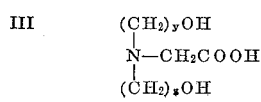

IV 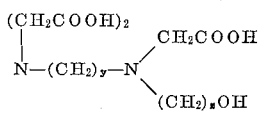

where $y$ and $z$ are integers of from 2 to 8,

V 

where X is an alkyl group having from 8 to 24 carbon atoms and

VI 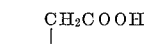

where R is a hydrocarbon group having from 6 to 22 carbon atoms and R' is an alkylene group having from 2 to 10 carbon atoms, present in amount from 0.05 to 0.2%.

3. The polyesterurethane of claim 2 wherein (B) is dodecyliminodiacetic acid.

4. The polyesterurethane of claim 2 wherein (B) is VI and R contains an average of 18 carbon atoms.

5. The polyesterurethane of claim 2 wherein (B) is ethylenediaminetetraacetic acid.

6. The polyesterurethane of claim 2 wherein (A) is hydroxyl poly(tetramethylene adipate) (B) is an amine acetic acid having the structure

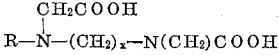

wherein $x$ is 1 to 6 and R is an alkyl group having an average of 13–18 carbon atoms and (C) is a diphenyl diisocyanate having an isocyanate group on each phenyl nucleus.

7. The polyesterurethane of claim 2 wherein (A) is hydroxyl poly(tetramethylene adipate) (B) is an aliphatic alkylene amine having the structure

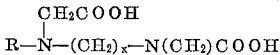

wherein $x$ is 1 to 6 and R is an alkyl group having an average of 13–18 carbon atoms and (C) is a diphenyl diisocyanate having an isocyanate group on each phenyl nucleus and there is also present in the reaction mixture an aliphatic glycol containing 2 to 10 carbon atoms the molar ratios of (A) and (B) being substantially equivalent to (C).

References Cited by the Examiner

UNITED STATES PATENTS 2,413,857   1/1947   Bersworth et al. ____ 260—31.8
3,228,904   1/1966   Morris et al. _____ 260—45.8

LEON J. BERCOVITZ, *Primary Examiner.*

DONALD E. CZAJA, *Examiner.*

G. W. RAUCHFUSS, Jr., *Assistant Examiner.*

UNITED STATES PATENT OFFICE
CERTIFICATE OF CORRECTION

Patent No. 3,298,995                           January 17, 1967

Robert R. Bloor et al.

It is hereby certified that error appears in the above numbered patent requiring correction and that the said Letters Patent should read as corrected below.

Column 1, line 26, for "extend" read -- extended --; column 5, line 65, for "initialy" read -- initially --; column 6, lines 74 and 75, the formula should appear as shown below instead of as in the patent:

columns 9 and 10, TABLE B, second column, line 8 thereof, for "(0.007%)" read -- (0.07%) --; column 10, line 70, for "diioscyanate" read -- diisocyanate --; column 12, line 24, for "adiphate" read -- adipate --.

Signed and sealed this 17th day of October 1967.

(SEAL)
Attest:

EDWARD M. FLETCHER, JR.                         EDWARD J. BRENNER
Attesting Officer                               Commissioner of Patents